A. N. HADLEY.
POWER TRANSMISSION.
APPLICATION FILED JULY 6, 1906.
950,044.
Patented Feb. 22, 1910.
2 SHEETS—SHEET 1.
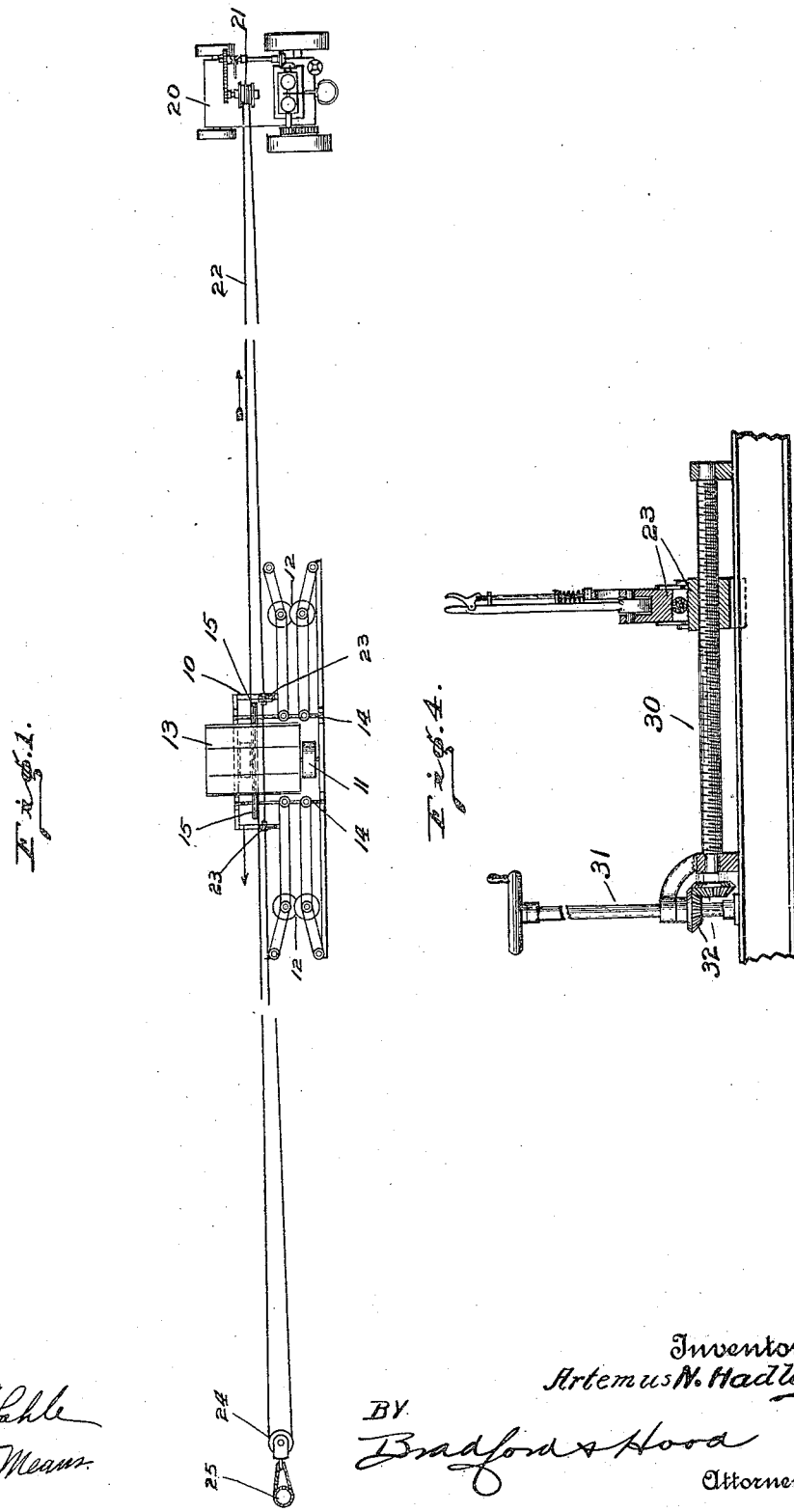
Witnesses
Frank A. Fahle
Thomas W. McMeans
Inventor
Artemus N. Hadley
BY
Bradford & Hood
Attorneys

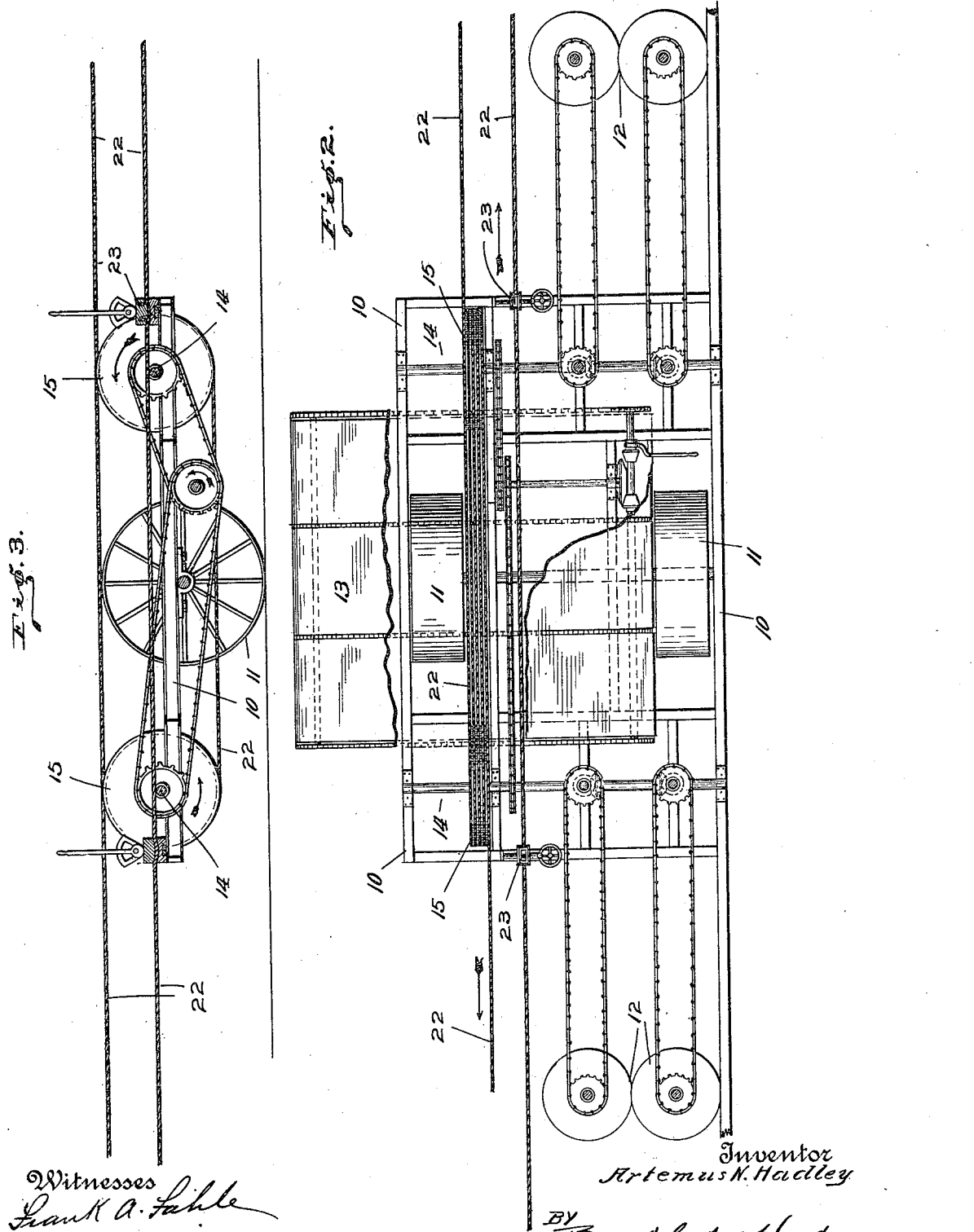

UNITED STATES PATENT OFFICE.

ARTEMUS N. HADLEY, OF INDIANAPOLIS, INDIANA.

POWER TRANSMISSION.

950,044.

Specification of Letters Patent.   Patented Feb. 22, 1910.

Application filed July 6, 1906. Serial No. 324,941.

*To all whom it may concern:*

Be it known that I, ARTEMUS N. HADLEY, a citizen of the United States, residing at Indianapolis, in the county of Marion and State of Indiana, have invented certain new and useful Improvements in Power Transmission, of which the following is a specification.

In crops such as sugar cane it is found that, at harvest time, the ground is so soft as to be unable to support a harvesting machine driven by the ordinary traction methods.

The object of my present invention is therefore to provide an improved method of power transmission by means of which a machine may be transported by an independent stationary motor and its mechanism be simultaneously driven, preferably by the same motor, which may remain fixed during the movement of the machine from one end of its travel to the other.

The accompanying drawings illustrate my invention as applied to a stalk harvesting machine.

Figure 1 is a diagrammatic plan of an embodiment of my invention; Fig. 2 an enlarged plan, largely diagrammatic in character, of the means by which simultaneous transportation of the machine as a whole and manipulation of its machinery may be accomplished by the independent motor; Fig. 3 a vertical sectional view below ropes 22 in Fig. 2, and Fig. 4 a detail of the rope alining mechanism.

In the drawings, 10 indicates the frame of a harvesting machine supported by suitable carrying wheels 11. The frame 10 carries stalk cutting mechanism 12 and a stalk delivering mechanism 13. In the present instance I have shown the machine as double-ended so that it need not be turned around for its return passage. Consequently there is a cutting mechanism 12 at each end of the vehicle. Journaled on the frame 10 are two shafts 14, 14 each of which carries a grooved pulley 15, and the shafts 14 are connected by suitable gearing with the cutting mechanism and delivery mechanism. The vehicle wheels are purely carrying wheels and preferably have no traction value relative to the machinery carried by the vehicle.

The motor 20, which may be of a traction type if desired, will be arranged at one end of the field transversely of the line of the travel of the harvester and will be provided with a winding drum 21 around which will be wrapped an endless cable 22. The cable 22 passes from drum 21 over frame 10 of the vehicle through a pair of cable clutches 23 23, one at each end of the machine; from thence to the opposite end of the field and around a pulley block 24 which is anchored to a movable anchor 25; from thence back to the harvester where a sufficient number of turns are taken around the two pulleys 15; and from thence to the drum 21.

In order to balance the vehicle relative to the pull of the cable 22, I prefer to provide a cable clutch at each end of the machine as shown, and each of these clutches is transversely adjustable by any suitable means. For instance, the main body of the clutch may be carried on a threaded shaft 30 journaled on the vehicle frame and rotated by means of an upright crank shaft 31 geared to the shaft 30 by suitable gears 32.

In operation, the parts will be assembled as shown in Fig. 1 and the cable driven in the direction indicated by the arrow in Fig. 1, the taut side of the cable passing from the drum 15 to the drum 21. As the drum 21 is drawn in the direction indicated by the arrow, the wheels 15 will be rotated and the mechanism of the harvester will be driven. At the same time the slack side of the cable, being clutched to the harvester frame, will draw the harvester frame in the direction indicated by the arrow. When the farther end of the field has been reached the engine will be shifted transversely of the field a desired distance and the direction of movement of the cable will be reversed, thus drawing the harvester across the field toward the motor 20. When the motor end of the field has been reached anchor 25 will be shifted transversely of the field and the operation repeated. By using a double-ended harvester it will be unnecessary to turn the machine. By this means the harvester may be made comparatively light, as there will be no need of any traction value of the carrying wheels.

I claim as my invention:

1. The combination with a vehicle and machinery carried thereby, of an independent motor, and a driving connection between the motor and the vehicle independent of traction wheels and a driving connection between the motor and the machinery of the vehicle which, upon operation, may simultaneously transport the vehicle relative to the motor and operate the machinery of the vehicle.

2. The combination with a non-traction vehicle and machinery carried thereby, of an independent motor, an endless cable driven by said motor, means for supporting said cable at a distance from the motor, means for attaching one side of said cable to the vehicle, and means driven by the other side of the cable for operating the vehicle machinery whereby movement of the cable produced by the motor will produce simultaneous transportation of the vehicle and operation of its machinery.

3. The combination with a vehicle and machinery carried thereby, of an independent motor, an endless cable driven by said motor, means for supporting said cable at a distance from the motor, means for attaching one side of said cable to the vehicle, and means driven by the other side of the cable for operating the vehicle machinery whereby movement of the cable produced by the motor will produce simultaneous transportation of the vehicle and operation of its machinery.

4. The combination with a non-traction vehicle and machinery carried thereby, of an independent motor, an endless cable driven by said motor, means for supporting said cable at a distance from the motor, means for attaching one side of said cable to the vehicle, a drum engaged by the other side of the cable for operating the vehicle machinery whereby movement of the cable produced by the motor will produce simultaneous transportation of the vehicle and operation of its machinery.

5. The combination with a vehicle and machinery carried thereby, of an independent motor, an endless cable driven by said motor, means for supporting said cable at a distance from the motor, means for attaching one side of said cable to the vehicle, and a drum engaged by the other side of the cable for operating the vehicle machinery whereby movement of the cable produced by the motor will produce simultaneous transportation of the vehicle and operation of its machinery.

6. The combination with a non-traction vehicle and machinery carried thereby, of a motor independent of the vehicle, and means connected with said motor for simultaneously driving the machinery and transporting the vehicle relative to the motor.

In witness whereof, I, have hereunto set my hand and seal at Indianapolis, Indiana, this 28th day of June, A. D. one thousand nine hundred and six.

ARTEMUS N. HADLEY. [L. S.]

Witnesses:
   THOMAS W. MCMEANS,
   ARTHUR M. HOOD.